Inventors
DANIEL COHEN
JACQUES H. DEJEAN
By [signature]
Attorney

Inventors
DANIEL COHEN
JACQUES H. DEJEAN
By [signature]
Attorney

Inventors
DANIEL COHEN
JACQUES H. DE JEAN
By [signature]
Attorney

Inventors
DANIEL COHEN
JACQUES H. DE JEAN
By [signature]
Attorney

Inventors
DANIEL COHEN
JACQUES H. DEJEAN
By [signature]
Attorney 3,453,603

SEMI-PERMANENT CAPACITOR MEMORY

Daniel Cohen, Paris, and Jacques Henri Dejean, Sartrouville, France, assignors to International Standard Electric Corporation, New York, N.Y., a corporation of Delaware Filed July 20, 1966, Ser. No. 566,669

Int. Cl. G11b 9/06

U.S. Cl. 340—173 3 Claims

The present invention concerns circuits planned for recording and then reading information in binary form. In a classical memory, for instance a memory using cores in a magnetic matter, each elementary piece of information is registered in a determined memory cell so that the breakdown of this cell entails the loss of the information. When one wants to increase the reliability of such systems, one has to multiply the number of cells used to record an elementary piece of information. The adopted solutions often have the inconvenience of not enabling the desired reliability to be adapted to the necessary amount of equipment in a continuous way. For instance, in arranging in parallel three memories associated to a majority logic, the probability of failure is raised to the power two and the amount of equipment used is multiplied by three.

One object of the present invention is to provide a memory in which it is possible to adjust the degree of reliability and the amount of equipment used in a continuous way.

The present invention will be particularly described with reference to the accompanying drawings in which.

The embodiments of memories using the invention will be described with reference to their application in the following application example which will provide a better understanding of the advantages of this type of memory. In order to enable their control by a computer, the components in stock are indexed according to their various characteristics such as their length, their width, their thickness, the material in which they are made . . . , each characteristic being defined by a code composed of a varying number of digits depending on the various possible variants of the said characteristic; thus each component is indexed by a $n$-binary digit code for example; as a result of the digits assignment all the possibilities of the code are not exhausted and the number of components which are thus classified is certainly smaller than $2^n$. At a given time the number of components in stock is $p \ll 2^n$ and one wants to know quickly if a component with a defined code is in stock.

A solution consists in recording the $p$ codes of the $p$ components in a memory comprising $p$ lines each having $n$ memory elements and then comparing the code of the component being looked for to each of the different recorded codes; this solution is time-consuming and the malfunction of a single memory element can result in an error.

Figure 1:
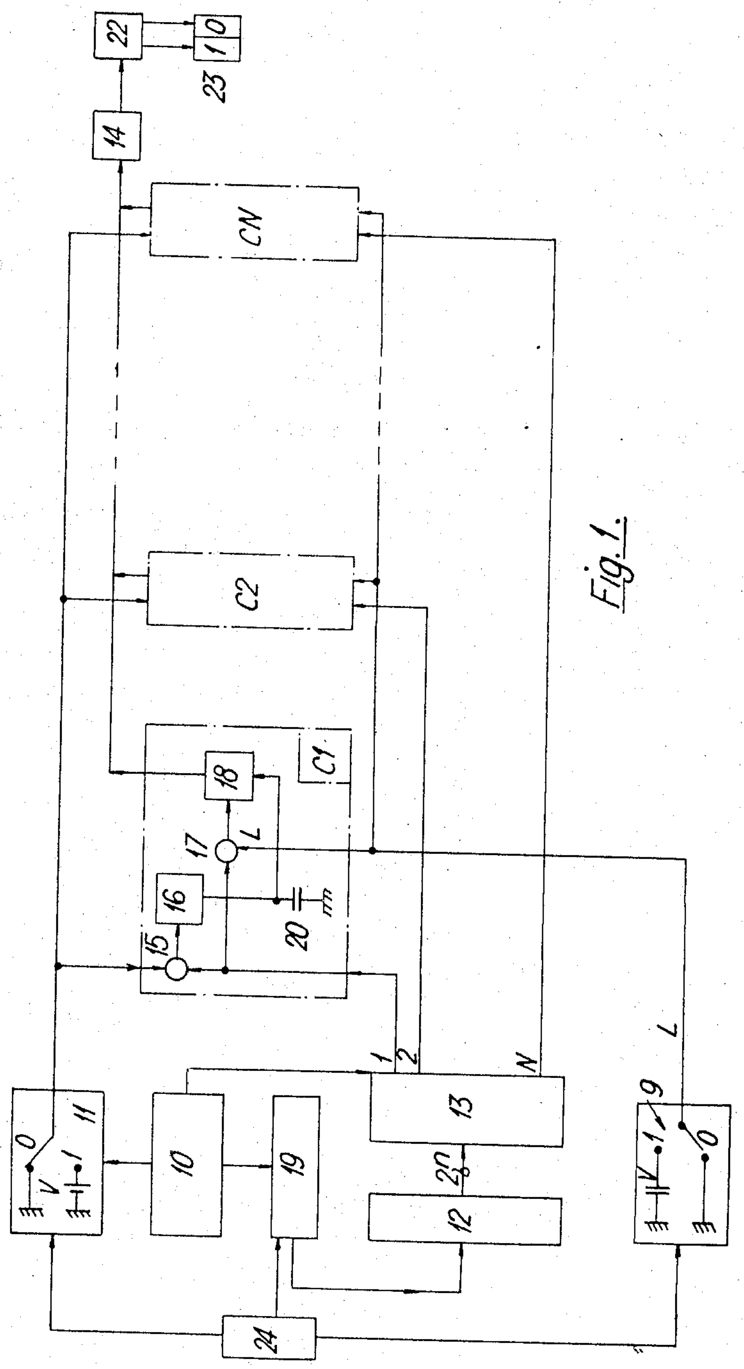
FIGURE 1 represents a schematic embodiment of the present invention.

Another solution consists in using a memory presenting characteristics of the present invention such as the memory represented schematically in FIGURE 1.

This memory comprises N capacitors, four thousands for instance, and the different memory cells, each comprising a capacitor and its associated circuits, will be called C1, C2 . . . CN. As all the memory cells are identical only cell C1 has been shown in detail. The said cell C1 comprises a capacitor 20 one terminal of which is connected to the earth while the other terminal is connected to the output of a current generator 16 and to the input of a circuit 18. The current generator 16 is normally blocked and it yields a constant current which only charges capacitor 20 during the coincidence period of the positive signals applied to the two inputs of the electronic coincidence gate or AND circuit 15; one of the inputs of AND circuit 15 is connected to output 1—in the case of memory cell C1—of a circuit 13 with N outputs; the $N-1$ other outputs of circuit 13, labelled 2 to N, being connected to memory cells C2 to CN respectively; the other input of the said AND circuit 15 is connected to a circuit 11 which yields the binary information 0 or 1 to be registered corresponding to the address displayed in the $n$-digit register 19 which drives circuit 13. By convention digit 1 will correspond to a positive signal whereas digit 0 will produce no signal, i.e. the wire presenting this piece of information will be at the earth potential; also by convention one of the N output wires of circuit 13 will be said to be "activated" when it shows a positive signal, its rest potential being that of the earth. On FIGURE 1, circuit 11 is schematized by a two-position switch which enables one to obtain either a positive signal (position 1) corresponding to the binary digit 1 or the earth potential (position 0) for the digit 0, this last position being also its rest position; the positive signal is obtained from a voltage generator V. The read-out signal L is yielded by a circuit 9 schematized as is circuit 11, by a two-position switch which enables one to obtain either a positive signal (position 1) corresponding to the read-out enabling L or the earth potential (position 0), this last signal blocking the AND circuits 17. Upon recording, an address code stored in register 19 and the nature of the piece of information to record which controls the position of circuit 11's switch are transmitted to the memory. Upon reading, the address code of the piece of information which is wanted to retrieve—a code stored in register 19—and a piece of information indicating that it is a read-out and which controls the position of circuit 9's switch are transmitted to the memory. All these pieces of information are assumed to be transmitted to the memory through circuit 24, outside the memory and whose description is not within the scope of the present invention. It is assumed, moreover, that the circuits are designed in such a way that at read-out time circuit 11's switch is in position 0 whereas at write time circuit 9's switch is in position 0.

Circuit 18 is a circuit designed in such a way as to present an input impedance of a high value whatever its state, blocked or unblocked; this being a necessary condition for capacitor 20 not to be discharged; upon read-out of cell C1, circuit 18 is unblocked and yields a current or a voltage proportional to the charge voltage taken by capacitor 20 upon recording. This circuit 18 is controlled by an AND circuit 17 one of the inputs of which receives the read-out signal L and the other one of the signal of output 1 of circuit 13 in the case of memory cell C1.

When using such a memory, the capacitors are discharged before each recording by means not represented on FIGURE 1.

For a certain $n$-digit code displayed in register 19, decoder 12 yields a signal on an output, one of $2^n$; on FIGURE 1, the sign which goes with $2^n$ indicates a group of $2^n$ wires. The logic circuit 13 or coder circuit marks $k$ output wires out of the N wires. One will take for instance $k=300$. Circuit 13 can be implemented in the form of a diode encoder as is well known in the technical field, each of the $2^n$ inputs feeding $k$ outputs through $k$ coupling diodes. Another code will activate another combination of $k$ wires out of N; the two combinations corresponding to the chosen addresses will possess common elements. By convention, the recording of a binary digit 1 will produce a unit charge of each of the $k$ capacitors selected by the corresponding address; the said unit charge adding to the sum of the various charges already taken by each capacitor upon the recording of other digits 1; on the other hand, the recording of a digit 0 will provoke no charge voltage of the capacitors will not change; it should be noticed that the combinations which are not used are treated in the same way as the combinations which record a 0.

It is easy to see that the number of possible combinations of N elements taken $k$ at a time is very high, e.g. a number close to $10^{450}$ for $N=4,000$ and $k=300$. However, according to a feature of the present invention only a small number of combinations are used, this number being besides far less than $2^n$ and it is assumed moreover that only $p$ out of them must correspond to the recording of a digit 1, these $p$ combinations being distributed at random among the $2^n$ combinations likely to be used; these $2^n$ combinations on the other hand are distributed at random among the $$\binom{N}{k}$$

possible combinations. For instance, in a memory built according to the present invention and comprising $$N=4,000$$

capacitors or memory cells, $p=150$ binary digits 1 will be recorded, each binary digit 1 being recorded in $k=300$ memory cells. Upon recording in such a memory, the reading signal L is absent—as circuit 9 is in position 0—and the AND circuits 17 of the various memory cells are blocked so that circuit 18 is likewise blocked. For a given code displayed in register 19, $k$ out of N output wires of circuit 13 are activated and drive the $k$ corresponding AND circuits 15. If the digit to be registered is a 1, the $k$ AND circuits 15 yield a signal for unblocking the associated generator 16; generator 16 then yields a constant current which charges capacitor 20 during a defined time; it is understood that in order to obtain a unit charge with the same value in the memory cells, the generators 16 should be identical and the charge duration, i.e. the duration of generators 16' unblocking should be the same in each cell; for instance, in the particular example described, one assumes that the unblocking time is determined by the presence duration of the positive signal on the output of the AND circuit 15, i.e. the coincidence duration of the input positive signals; now, if one assumes that the signal corresponding to digit 1 has such a duration that it frames the signal yielded by circuit 13, the duration of the latter will determine the charging time of the capacitor and it has therefore to be the same for each memory cell.

If the digit to be registered is a 0, the AND circuits 15 do not yield any unblocking signal and no current will charge the capacitors.

The circuit labelled 10 is a clock which yields the various signals necessary for the operation and synchronization of the various circuits.

When the $p=150$ digits 1 have been recorded in the way previously described, they can be read afterwards in a way that will be described.

When reading, the various AND circuits 15 as well as the associated generators 16 are blocked because the device 11 yields an earth signal; on the other hand, the AND circuits 17 will yield a signal for unblocking the associated circuits 18 if the output wires of circuit 13 are activated, the reading signal L being yielded by circuit 9 in position 1.

For this reading, one displays in the address register 19 the code for which one wants to know if the piece of information previously recorded was a 1 or a 0, i.e., in the proposed example, if the component whose code is displayed is in stock or not.

For a given address, the $k$ circuits 18 are unblocked and yield for instance a current proportional to the charge voltage taken by the capacitor upon recording; these $k$ currents with different values are added in a circuit 14; their sum is then compared to a threshold in circuit 22 which determines whether the binary digit recorded at this address is a 1 or a 0 and which sets flip-flop 23 in one of the 1 or 0 states depending on whether the said sum is greater or smaller than the threshold. For another address displayed in register 19, one obtains another sum which is compared to the same threshold value and the result of the comparison sets flip-flop 23 in 1 state or 0 state.

Figure 3:
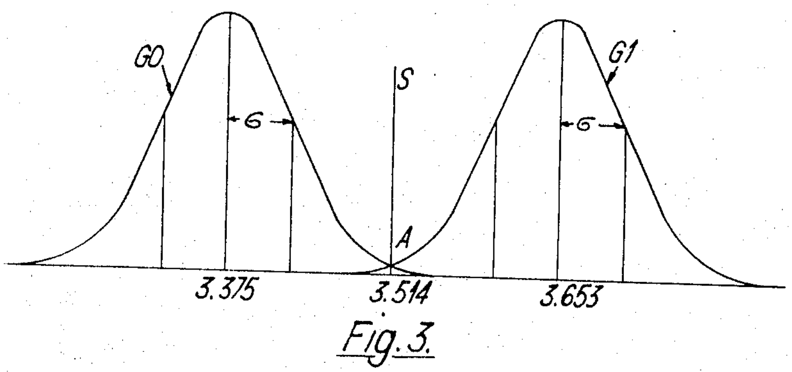
FIGURE 3 represents the statistical distribution curves of the charge of the capacitors depending on whether they record a digit 1 or a digit 0.

This threshold value is determined as a function of the numbers N, $k$ and $p$. In computing the threshold value, one assumes that the ratio $k/N$ is small compared to 1 in order to be able to use a normal of Gaussian law as an approximation to the distribution of the charges taken by the capacitors. With the figures previously mentioned and taking the elementary charge as the unit of charge, one shows that the charges corresponding to the binary digits 0 are distributed according to a Gaussian curve with standard deviation $\sigma=53.6$ centered on three thousand three hundred and seventy-five charge units (curve $G_0$, FIGURE 3) whereas the charges corresponding to the digits 1 are distributed according to a Gaussian curve with the same standard deviation but centered on three thousand six hundred and fifty-three charge units (curve $G_1$). FIGURE 3 shows these two curves $G_0$ and $G_1$ and their relative positions.

These two curves enable the selection of a threshold value as a function of some criteria; for instance, if one gives the same importance to deciding for a 1 instead of a 0 and to deciding for a 0 instead of a 1, one must select a threshold value in such a way that probabilities of deciding for a 1 instead of a 0 and of deciding for a 0 instead of a 1 are equal; now, as the two curves are identical, this value will be that of the abscissa of the common point A of the said curves, i.e. $S=3,514$ charge units. By consulting the tables of the normal distribution function, one determines the error probability which can be tolerated in selecting $S=3,514$ i.e. 0.5 percent.

Thus, when the memory operates with no breakdown a low but not negligible error probability of 0.5 percent will be tolerated, this error probability originating from the particular organization adopted for the said memory; however it can easily be understood that the failure of one or several memory cells does not modify this error probability significantly.

Figure 2:
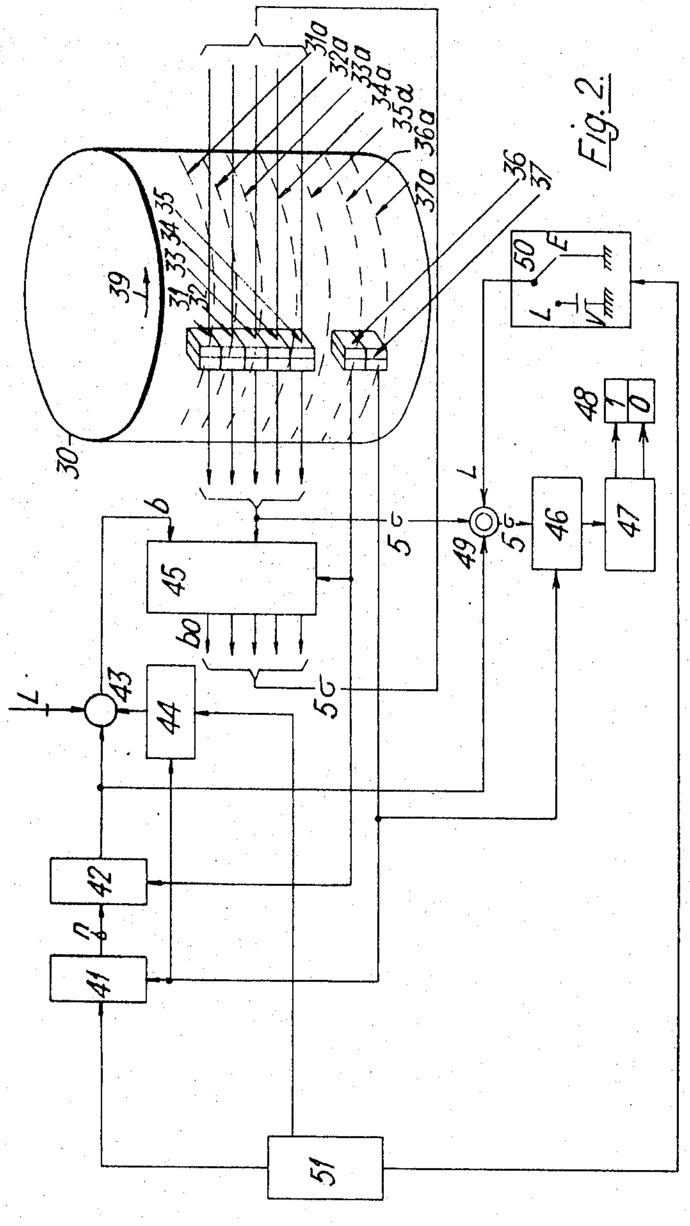
FIGURE 2 represents another particular embodiment using a magnetic drum.

The aim of the embodiment described with reference to FIGURE 1 has been essentially to illustrate the principle of a so-called "distributed redundancy" memory presenting features of the invention and using simultaneous combinations of $k$ capacitors out of N; such an organization forces one to use a large number of identical circuits such as AND circuits and current generators and, one can imagine that it is possible in this case to replace combinations of $k$ memory elements out of N by combinations of $k$ moments out of N, each moment being assigned to a determined element. FIGURE 2 shows an embodiment of a memory presenting features of the invention and whose various combinations are realized in a time division way. The said memory is realized by means of a magnetic drum 30 one track of which, such as 31$a$, can record N binary pieces of information 0 or 1. The driving device of the said drum is not shown of FIGURE 2 but one will assume that the drum rotates at constant speed in the direction shown by arrow 39. To this drum are associated recording and reading circuits represented by the parallelepipedic blocks, on block per track labelled 31 to 37, the corresponding tracks being labelled 31*a* to 37*a*. On track 36*a*, N digits 1 are recorded, one per generatix, and block 36 yields N pulses per drum rotation. On track 37*a*, a single digit 1 is recorded so that circuit 37 yields only one pulse per drum rotation. The signals read on these two tracks 36*a* and 37*a* are used to synchronize the various circuits associated to this drum.

In order to simplify the account, it will be assumed that the recording and reading circuits 31 to 37 are placed along the same generatrix of the drum. Circuits 31 to 35 are designed in such a way that the read-out of a binary digit in a memory cell can be followed by the recording of another digit in the same cell, both operations taking place in the time interval which separates two signals read on track 36*a*. Such reading the writing circuits are well-known and they are described in the American review: "Proceedings of the Institution of Radio Engineers," October 1953, p. 1,438 under the title, "Combined Reading and Writing on a Magnetic Drum."

Before any writing of binary digits on the drum, all the digits previously recorded are erased by magnetizing all the tracks in a determined direction corresponding to the writing of a digit 0; the means to be used for effecting such a magnetization are not shown in FIGURE 2. The synchronization tracks 36*a* and 37*a* are then recorded using means not shown in FIGURE 2 and one will assume that these two tracks will no longer be erased.

Circuit 51—whose description is out of the scope of the present invention—is used to introduce in the memory information controlling reading or writing. In the case of writing, circuit 51 transfers an address code to register 41 and the type of information to be written 0 or 1. In the case of reading, circuit 51 transmits an address code and a read command signal. One assumes that the write command sets switch 50 in position E by means which are not shown.

For a given *n*-digit binary combination displayed in register 41, circuit 42 yields on the output wire (which constitutes one of the inputs of the electronic gate 43) a sequence of binary digits 0 and 1 synchronized with the signals read on track 36*a*. The display of the *n*-digit binary combination in register 41 is operated upon in synchronism with the signal read at each drum rotation on track 37*a;* in this way each of the N moments of the code yielded by the logic circuit 42 is always assigned to the same generatrix of the magnetic drum, i.e. to the same memory cell.

When writing operations take place, circuit 50 in position E does not yield any reading signal L so that the multiple AND circuit 49 is blocked whereas AND circuit 43 is unblocked. On AND circuit 43, the horizontal bar across arrow L indicates an inhibition signal, i.e. AND circuit 43 is cleared only when reading signal L is absent. Circuit 50 is schematized by a two-position switch, one position labelled L for reading—the circuit is then connected to the voltage source +V over earth—and E for writing—it is then connected to earth.

If the binary digit to be recorded is a 1 yielded by circuit 44 and if the digit of the code yielded by circuit 42 is likewise a 1, the electronic gate 43 is cleared and a signal corresponding to digit 1 is present on input *b* of the adder circuit 45. The function of this circuit is to add the binary digit to be recorded, a 1 in the present case, to the five binary digits read simultaneously on the generatrix of the drum which is, at this time, under the reading heads; obviously these five binary digits have different weights. Thus, each track 31*a* to 35*a* will be assigned to a determined weight and one will take by convention weight $2^0$ for track 31*a*, $2^1$ for track 32*a*, $2^2$ for 33*a*, $2^3$ for 34*a* and $2^4$ for 35*a*. Now, upon recording the first one, no 1 has yet been recorded so that the five digits read are all 0, the addition will yield 1 and only the output wire $b_0$ of the adder 45 corresponding to the weight $2^0$ will be activated; the signal will therefore be recorded on track 31*a* through circuit 31. Assuming that the writing and reading heads previously defined are used and that read-out and addition take place in a very short time compared to the transit time of the memory cell under the reading heads, i.e. compared to the time interval which separates two signals read on track 36*a;* the remainder of the time interval can therefore be used to perform, in circuit 45, the addition of the binary number read in the cell with that yielded by AND circuit 43 on wire *b*, then to record the binary number resulting from the addition in the said memory cell; the five digits of the said binary number are transmitted to the writing circuits through a group of five wires.

If the next digit yielded by circuit 42 is a 0, the electronic gate 43, i.e. by convention digits 1. If the digits read on the drum is a 0 so that one records the same digits one reads in the same memory points. It will therefore be well understood that digit 1 yielded by 44 will provide a writing in the said memory only when the code yielded by circuit 42 presents signals which clear electronic gate 43, i.e. by convention digits 1. If the drum presents N equidistant generatrices defining N memory cells, each cell composed of five memory points, this code yielded by 42 should have N moments and *k* digits 1 will be placed in these N moments, the positions of these *k* digits changing with the code displayed in register 41. The positions of these *k* digits 1 will correspond to *k* well defined drum generatrices i.e. to *k* memory cells and if the digit to be recorded is a 1, it will be written in the *k* generatrices thus selected. The various moments of the code are determined by the signals read on track 36*a*, each signal corresponding to a drum generatrix. The signal yielded by track 37*a* can be used also to free register 41 which can then receive a new address from circuit 51, and also to control circuit 46 which will be described in a later paragraph.

As in the example described in relation with FIGURE 1, *p* binary digits 1 are recorded and it is shown that each generatrix, i.e. each memory cell stores on the average $$p\times\frac{k}{N}$$

digits 1; it can then be deduced that the number *m* of necessary tracks will be such that $$2^m-1>p\times\frac{k}{N}$$

In the particular case in which $N=4{,}000$, $k=300$ and $p=150$ one must have $2^m-1>12$; one will take $m=5$, which provides a sufficient margin.

When the *p* digits 1 have been recorded, this memory constitutes a permanent memory which is read by displaying in register 41 the *n*-digit codes for which one wants to know if the piece of information previously recorded was a 1 or 0, i.e. for instance to know if the component whose code is displayed is in stock. Thus, for a certain combination displayed in register 41, circuit 42 yields *k* digits 1, the *k* digits clearing the multiple electronic gate 49 *k* times in an N-moment cycle; the binary numbers read on the drum during these *k* time intervals are applied to an accumulator circuit 46 which effects the sum of the *k* binary numbers received during a drum rotation comprised between two pulses yielded by track 37*a*. The said sum is then compared to a threshold in circuit 47 whose output signal sets flip-flop 48 in 1 state if the sum is greater than the threshold or in 0 state if the sum is smaller than the threshold. As in the case of the example described in relation with FIGURE 1, this threshold is determined as a function of the numbers N, *k* and *p* and also of the probability of error tolerated in reading a 1 for a 0 and a 0 for a 1. As the figures N, $k$ and $p$ are the same as those adopted for the memory described with reference to FIGURE 1, the threshold selected according to the same criteria will be $S=3\,514$ charge units likewise.

During the recording sequence the signals read are also applied to the multiple electronic gate 49, but the latter being blocked due to the absence of the read-out signal L, the accumulator 46 does not receive any binary digit. On the other hand, during the reading sequence, the reading signal L being present, circuit 49 is cleared at each of the $k$ selected moments and the signals read are applied to the accumulator 46, these signals are also applied to the adder 45 which receives on its input $b$ a digit 0 because circuit 43 is blocked, the reading signal L being present; adder 45 then operates as a register and the signals read are therefore recorded a second time in the same memory points; this operation does not in any way hinder the reading of such a memory.

When such a memory is integrated in an existing system, e.g. a computer system, circuit 51 is part of the said system; it is used in the particular embodiment described only to show a self-contained embodiment. The same holds for circuit 24 of FIGURE 1.

The memory, two embodiments of which have just been shown, makes a large number of memory elements available this number being equal to the number of possible combinations of N elements taken $k$ at a time, i.e.

$$\binom{N}{k}$$

combinations which gives approximately a number $A=10^{450}$ when $N=4{,}000$, $k=300$. Only $p$ out of these A possible combinations contain a digit 1; the other combinations contain a digit 0 or are not used so that such a memory would enable the recording of $$\binom{A}{p}$$

N-digit codes with $p$ digits 1; the capacity of such a memory is given by $$\operatorname{Log}_2\binom{A}{p}$$

i.e. approximately two hundred and fifty thousands digits when $p=150$. If one compares this number to the capacity of the drum used which is of $N\times m=20{,}000$ digits, one can see that a memory with a capacity of 20,000 digits used according to the characteristics of the present invention is equivalent, as far as the recognition of a small number of combinations out of a large number of possible combinations is concerned, to a memory with a capacity of two hundred and fifty thousands digits.

The following are details of the circuits represented in FIGS. 1 and 2.

Figure 4:
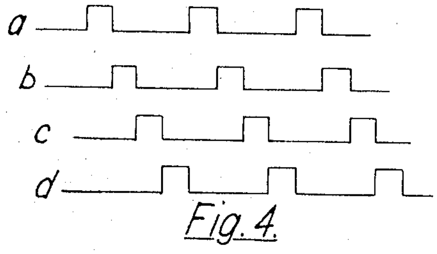
FIGURE 4 represents the circuit 10 clock signals.

The circuit 10 of FIGURE 1 is a clock unit delivering cyclically four adjacent positive signals $a$, $b$, $c$ and $d$ of FIGURE 4; the first signal $a$ is used for recording a $n$-digits code provided by the circuit 24 in the $n$-digits register 19; the second signal $b$ is used for positioning the circuit 11 according to the digit provided by the circuit 24; the third signal $c$ is used for opening the N output AND-circuits of the circuit 13; the fourth signal $d$ is used for resetting to zero the register 19. This clock unit comprises FIGURE 5 an oscillator followed by a saturated amplifier and a differentiation circuit the positive output pulses of which are applied to a counter having two flip-flops; the four outputs (1 and 0 outputs) of this counter are connected to a decoder circuit having four output wires $a_1$, $b_1$, $c_1$, $d_1$, the one of which is only activated for a certain code displayed by the counter.

The circuit 19 of FIGURE 1 is a $n$-digits register comprising $n$ flip-flops which are reset to zero during the fourth signal $d$ of a clock cycle; this register has $n$ input wires connected to the circuit 24 and 2 $n$ output wires connected to the decoder circuit 12.

Figures 5, 6:
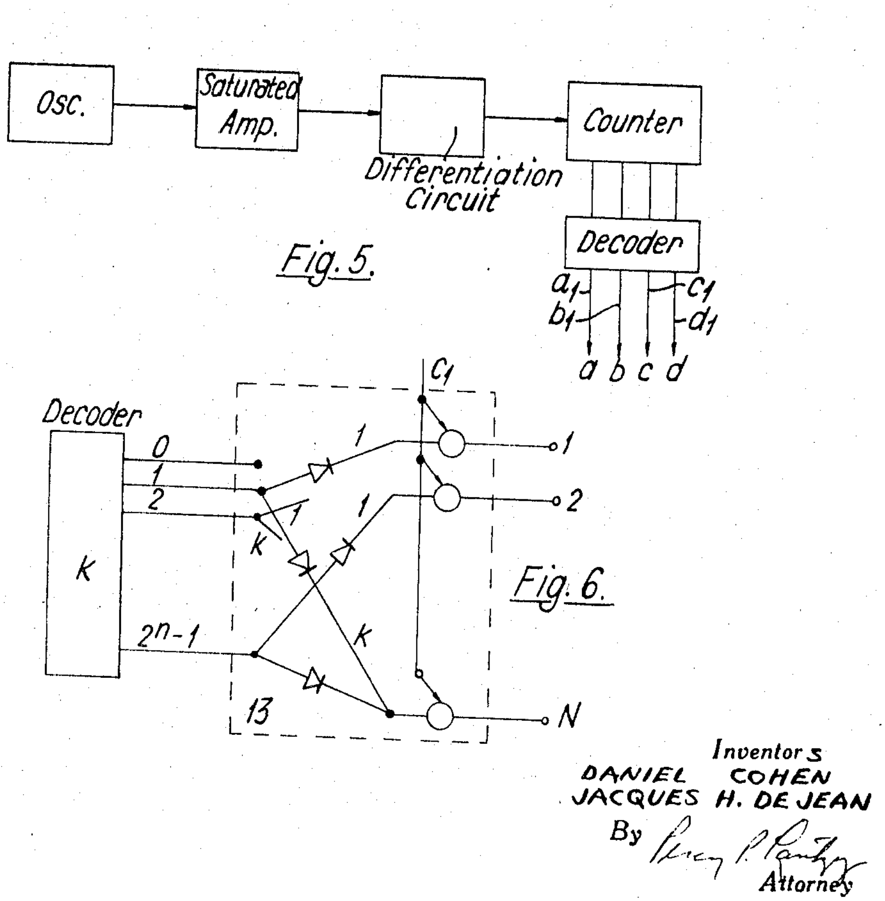
FIGURE 5 represents the clock unit.
FIGURE 6 represents wiring of the coder 13.

The circuit 12 of FIGURE 1 is a well-known decoder circuit having 2 $n$ input wires connected to the register 19 and $2^n$ output wires connected to the circuit 13 and comprising for example a diode decoding matrix permitting to activate one output wire among the $2^n$ output wires for a certain $n$-digits code displayed by the register 19; the code comprising $n$ 0-digits is decoded but corresponds to the output 0 of this decoder which is not used in the circuit 13, FIG. 6.

The circuit 13 of FIGURE 1 is a coder having $2^n$ input wires and N output wires ($N=4000$) and permitting to activate a combination of $k=300$ output wires among the N output wires when one input is activated, another combination of $k=300$ output wires being activated when another input is activated, these two combinations having common elements; this coder is realized by a wiring wih diodes between the $2^n$ inputs and the N outputs FIGURE 6; the input 0 corresponding to the code only having 0-digits is not used.

Each output wire has an AND-circuit controlled by the third signal $c$ of a clock cycle.

When this memory is used for knowing if a given component, corresponding to a certain $n$-digits code, is in stock the circuit 24 of FIGURE 1 is a finger-board having $n+2$ touches; $n$ touches for writing the $n$-digits code these $n$ touches being connected to the register 19, one touch for positioning the circuit 9 and one touch for positioning the circuit 11.

When this memory is a part of a calculator the circuit 24 is more complicated and principally comprises register controlled by the calculator, this memory and the calculator being synchronized.

Figure 7:
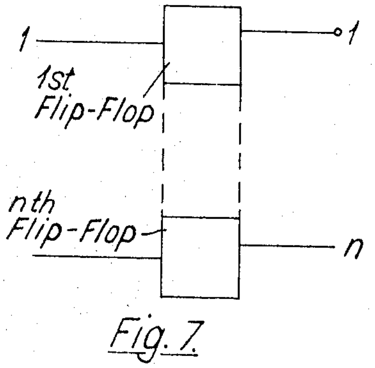
FIGURE 7 represents the clock pulse track 37*a* of the drum 30.

The circuit 41 of FIGURE 2 is a $n$-digits register having $n$ inputs connected to the circuit 51 and $n$ outputs connected to the circuit 42 and comprising $n$ flip-flops which are reset to zero at each clock pulse provided by the track **37*a* of the drum 30** FIGURE 7.

Figure 8:
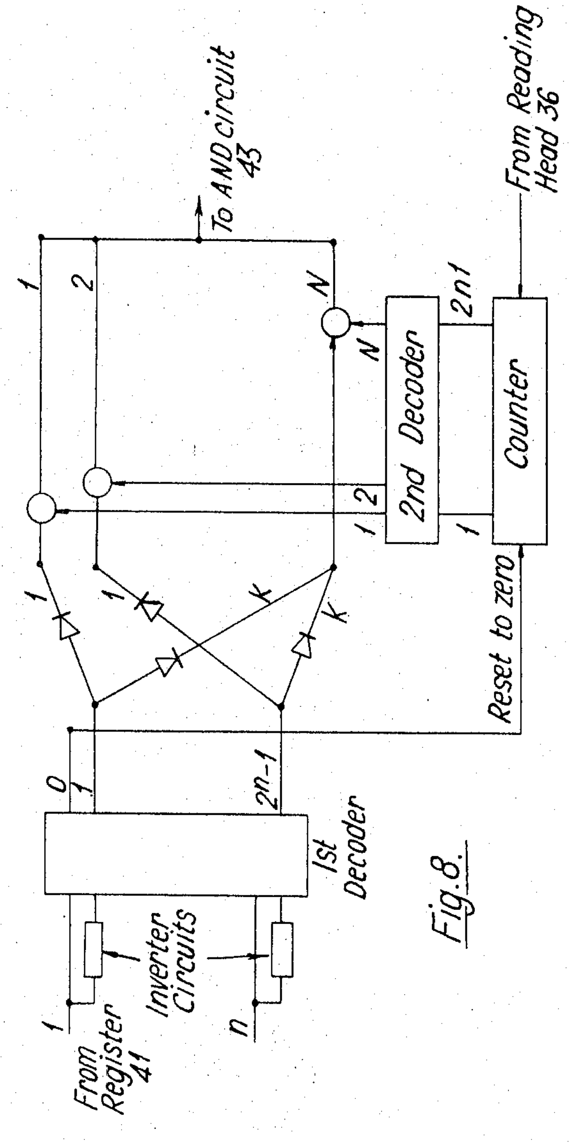
FIGURE 8 represents a schematic of the circuit 42 of FIGURE 2.

The circuit 42 of FIGURE 2 has $n$ inputs connected to the register 41 and one input connected to the AND circuit 43; this circiut comprises FIGURE 8, a first decoder, the same as the decoder 12 of the FIGURE 1 but having inverter circuits in parallel on each input. This decoder is followed by a coder the same as the coder 13 of the FIGURE 1, each output of this coder having an AND circuit which is controlled by one output wire of a second decoder circuit associated to a binary counter receiving the clock pulses provided by the track **36*a* of the drum 30; this counter has $n_1=12$ flip-flops ($2^{n_1}>N$) which are reset to zero when the 0-output of the first decoder is activated, i.e. when the register 41 is reset to zero by the clock pulse provided by the track 37*a* of the drum 30**; the code comprising $n_1$ 0-digits is not decoded.

The circuit 44 of FIGURE 2 is a circuit which is identical to the circuit 11 of the FIGURE 1 but it is not necessarily put in the 0 position by the circuit 51 for the reading.

Figure 9:
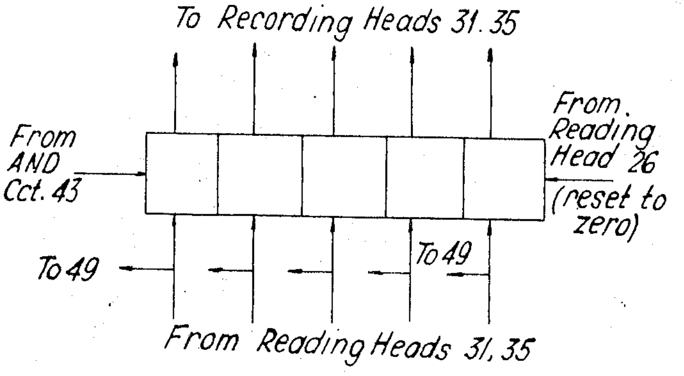
FIGURE 9 represents an adder such as present in circuit 45.

The circuit 45 of FIGURE 2 is an adder circuit which performs the adding of the five digits binary number read on a generatrix of the drum 30 with the digit provided by the AND-circuit 43; during the recording this digit is 1 or 0 and its value is 0 during the reading; this adder has six inputs five of which are connected to the five reading heads and five outputs connected to the five recording heads. Such an adder comprises for example FIGURE 9 a binary counter having five flip-flops which are reset to zero by the clock pulses provided by the track **36*a* then positioned by the signals read on a generatrix of the drum; this counter is controlled by the signal $b$ provided by the output of the AND cricuit 43** and advances only of one step when signal $b$ corresponds to the 1-digit.

It is clear that time delays are foreseen on different control signals for performing this modus operandi.

The circuit 46 of FIGURE 2 is an accumulator circuit which summate the binary numbers which pass through, during the reading, the multiple AND circuit 49 during the interval of time separating two clock pulses provided by the track 37*a*, the sum being displayed on a register having $n_2=12$ flip-flops ($2^{n_2}>3.514$); this accumulator is reset to zero by the clock pulse provided by the track 37*a*. Such an accumulator circuit is described in the book "Computer Handbook" edited by Harry D. Huskey and Gianino A. Korn—McGraw-Hill Company Inc., pp. 15–17. Each add operation is carried out during the interval of time separating two clock pulses of the track 36*a* and when the multiple AND circuit 49 is closed the accumulator adds a binary number 00000 to the result of the last add operation, this result being stored in a register which is reset to zero by the clock pulse provided by the track 37*a*.

The circuit 47 of FIGURE 2 is a comparator circuit comparing the two binary numbers displayed the one A by the output register of the accumulator 46 and the other S by a register which is positioned on the binary number corresponding to the decimal number threshold 3.514; when A is greater than S the comparator circuit sets the flip-flop 48 to 1-state and when A is smaller than S the comparator circuit resets the flip-flop 48 to 0-state; when the two binary numbers A and S are equal we choose for example to set the flip-flop 48 to 1-state. Such a comparator circuit is described in the Bell System Technical Journal of September 1958—p. 1184.

The circuit 51 of FIGURE 2 is the same as the circuit 24 of FIGURE 1.

The two examples described with reference to FIGURES 1 and 2 enable the recording of only one binary digit for a given combination; it is obvious that several devices of the same kind as those described above can be used in parallel and controlled by the same register and the same logic network, the threshold values being the same if number *p* is the same in each device. In the case of the magnetic drum for instance, one understands that if the number *m* of tracks per device is not very high, a single drum can be used for recording the various digits of each device.

While the principles of the above invention have been described in connection with specific embodiments and particular modifications thereof it is to be clearly understood that this description is made by way of example and not as a limitation of the scope of the invention.

What we claim is:

1. A memory comprising N elementary cells, each cell being provided for storing during the writing period the sum of elementary pieces of information which are applied to it, and restoring during the reading period a signal which is proportional to the sum of elementary pieces of information which are stored, means to select, during the reading or writing period, *k* cells among the N cells, each set of *k* cells among N cells constituting an address, means operating only during the writing of a 1 to add, in each cell so selected, an elementary piece of information to the ones which are already stored, means operating during the reading period and to which the output signals of the *k* selected cells are applied, a threshold circuit provided for comparing the sum of the said output signals to a threshold and determining whether the stored piece of information in the *k* cells is a 1 or a 0 according to whether the said sum is greater or smaller than the threshold.

2. Apparatus according to claim 1 wherein each elementary memory cell comprises a condenser, a load circuit providing to the condenser a known charge when the said cell is selected for the writing of a 1, a reading circuit comprising a very high input impedance circuit connected to the condenser, associated to a voltage or current generator, normally blocked, the said generator being designed for providing a voltage or a current which is proportional to the charge of the condenser when the said cell is selected for a reading.

3. Apparatus according to claim 1 wherein each elementary memory cell comprises a register, means operating during the writing of a 1 when the said cell is selected to read the number stored in the register and add a unit to this number, and means operating during the reading when the said cell is selected, to read the stored number in the said register.

References Cited

UNITED STATES PATENTS 2,832,887 4/1958 Kirschner ---------- 340—173

TERRELL W. FEARS, *Primary Examiner.*

U.S. Cl. X.R.

320—1